United States Patent [19]
Goebel

[11] 3,824,861
[45] July 23, 1974

[54] APPARATUS FOR DETECTING AND MEASURING IMBALANCE OF A MOTOR VEHICLE WHEEL ON A MOTOR VEHICLE

[75] Inventor: Eickhart Goebel, Pfungstadt, Germany

[73] Assignee: Gebr. Hofmann, KG., Darmstadt, Germany

[22] Filed: Aug. 2, 1973

[21] Appl. No.: 384,898

[30] Foreign Application Priority Data
Sept. 19, 1972 Germany............................ 7234410

[52] U.S. Cl. ............................... 73/457, 254/93 H
[51] Int. Cl. ............................................. G01m 1/28
[58] Field of Search..................... 73/457; 254/93 H

[56] References Cited
UNITED STATES PATENTS

| | | |
|---|---|---|
| 2,782,641 | 2/1957 | Allen ................................... 73/457 |
| 3,686,955 | 8/1972 | Butler .................................. 73/457 |
| 3,754,447 | 8/1973 | Smith et al........................... 73/457 |
| R24,230 | 10/1956 | Pearne ......................... 254/93 H X |

Primary Examiner—James J. Gill
Attorney, Agent, or Firm—Cushman, Darby & Cushman

[57] ABSTRACT

Apparatus for measuring imbalance of a motor vehicle wheel with a frame, a first cylinder mounted on the frame for movement with respect to the frame and having a stop portion for engaging the ground in one position and the frame in a second position, a spring about the first cylinder urging it upwards, a second cylinder mounted for movement within the first cylinder and engaging the wheel when forced upward by fluid pressure to also force the first cylinder downward against the urging of the spring until the stop portion engages the ground.

3 Claims, 1 Drawing Figure

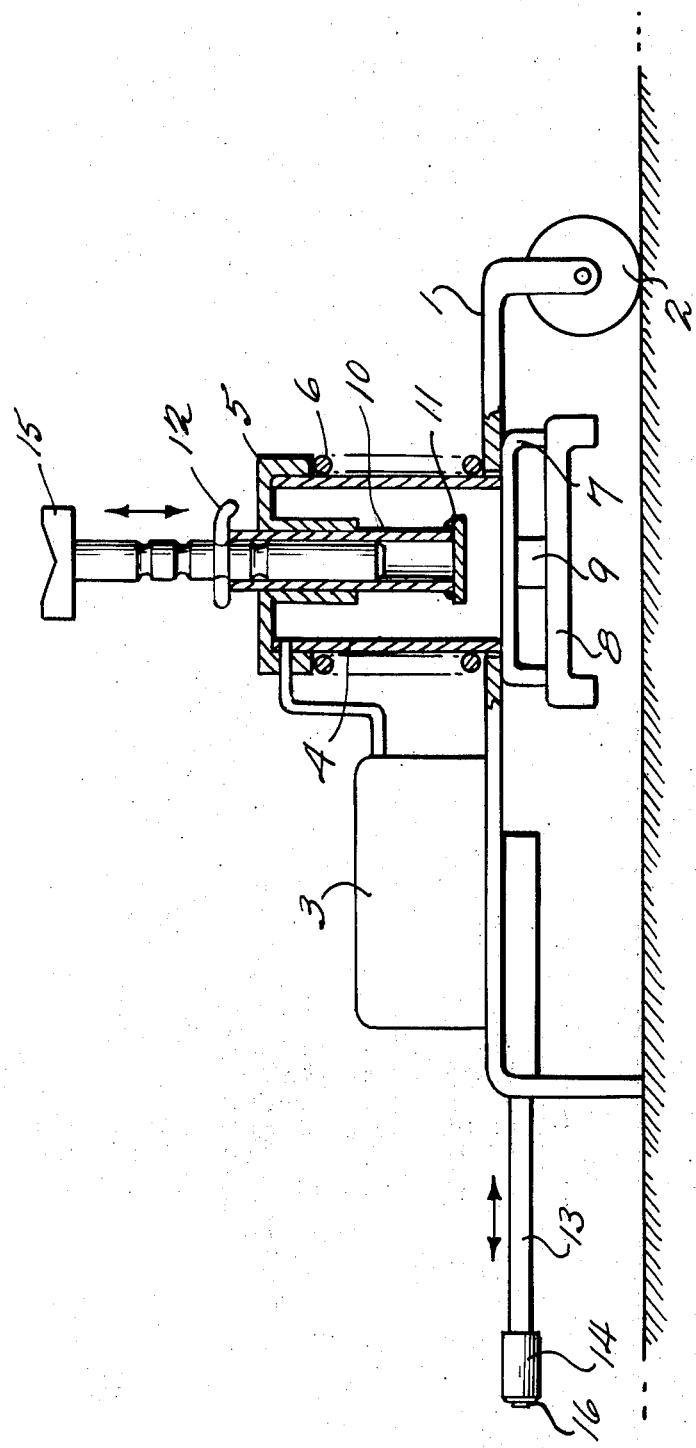

APPARATUS FOR DETECTING AND MEASURING IMBALANCE OF A MOTOR VEHICLE WHEEL ON A MOTOR VEHICLE

The invention relates to apparatus for detecting and measuring imbalance of a motor vehicle wheel while the wheel is mounted on a motor vehicle.

An apparatus for measuring the static imbalance of a motor vehicle wheel while the wheel is mounted on the motor vehicle has been proposed, in the form of a lifting means which lifts the wheel by applying a force in the vicinity of the wheel bearing. The apparatus includes a conventional force-measuring cell to measure the magnitude and the angular position of the imbalance.

According to the present invention, there is provided apparatus for detecting and measuring imbalance of a motor vehicle wheel on a motor vehicle, comprising means for lifting the wheel by applying a force in the vicinity of the wheel bearing, a force-measuring means for providing a signal indicating the magnitude and angular position of the imbalance, and means for raising the lifting means, when in the unloaded condition, completely or partly from a surface on which the apparatus stands.

An embodiment of apparatus according to the present invention will now be described by way of example with reference to the accompanying drawing which shows a diagrammatic view of the apparatus in partial cross-section.

As shown, the apparatus has a main frame or base plate 1 which carries rollers 2 so that the imbalance-measuring apparatus can be manually pushed into position below a motor vehicle of which a wheel is to be subjected to an imbalance-detecting and measuring operation. Provided on the base plate 1 in a conventional hydraulic assembly 3 for actuating a lifting means in the form of a hydraulic piston-cylinder unit also carried on base plate 1. The piston-cylinder unit comprises a cylinder 4 whose upper end carries an end cover member 5 with a depending rim portion which projects downwardly in the drawing on the outside of the cylinder 4. Arranged between the rim portion of cover member 5 and base plate 1, and around the cylinder 4, is a resilient means in the form of a spring member 6. Cylinder 4 extends through an aperture in the base plate 1 and is therefore slidable vertically relative to the base plate 1. The force of spring member 6 urges the cylinder 4 upwardly to lift the lifting means clear of the ground surface on which the apparatus stands while the apparatus is unloaded.

Carried on the lower end of the cylinder 4 is a second resilient means in the form of a bow-shaped spring member 7 which is in turn connected to a base plate 8 on which there are preferably provided three support surfaces for supporting the lifting means on the ground surface. Arranged between base plate 8 and spring member 7 is a conventional force-measuring unit 9 such as a conventional load cell. Spring member 7 inter alia prevents cylinder 4 from being lifted by spring member 6 beyond a predetermined distance from the ground surface.

The piston-cylinder unit also includes a piston 10 in the cylinder 4, in the form of a plunger piston. A plate 11 is carried at the lower end of the piston 10. In the fully raised condition of the lifting means, in which the vehicle wheel is lifted clear of the ground surface, plate 11 bears against the underside of end cover 5 of cylinder 4, or more precisely against a downwardly projecting portion guiding piston 10, and is then pressed thereagainst by a hydraulic overpressure within cylinder 4. This results in piston 10 and cylinder 4 being made rigid relative to each other sufficiently to ensure that vibrations at the wheel bearing, caused by wheel imbalance, are satisfactorily transmitted to the load cell 9.

The apparatus includes an adjusting device 12 for pre-adjustment of the height of the apparatus according to the height and type of vehicle to be lifted. Device 12 permits the distance between member 15 and the outer portion of cylinder 10 to be varied. A bar 13 permits the apparatus to be rolled easily into position below the vehicle. The bar 13 can be extendibly mounted in the apparatus, for ease in handling the apparatus. The hydraulic assembly 3 can be controlled by actuating a switch 16 which is carried on a handle 14 on the bar 13. Mounted on the upper end of the piston 10 or a prolongation thereof is a support prism member 15 for supporting the vehicle in the vicinity of the wheel bearing of the wheel whose imbalance is to be detected and measured. When the apparatus is rolled into a suitable position below the vehicle, the assembly 3 is actuated to cause the piston 10 to be displaced upwardly until the support prism member 15 bears lightly against the motor vehicle from below. Upon continued actuation of the assembly 3 in the direction of further upward movement of the piston 10, the cylinder 4 is displaced downwardly against the force of the spring member 6, whereby the base plate 8 is set down onto the ground and the apparatus stands firmly and securely. Detection and measurement of any imbalance of the motor vehicle wheel supported by the apparatus can then be effected in known manner, by rotating the wheel so that any imbalance will produce a vibration which is transmitted to the load cell for evaluation in known manner by related components to indicate both the location and magnitude of imbalance (not shown). The fact that the lifting means bears against the motor vehicle axle in the vicinity of the wheel bearing ensures satisfactory transmission of the imbalance vibrations to the apparatus, since the only components between the wheel and the apparatus are metal and are therefore rigid.

It will be apparent that in the unloaded condition, when the lifting means is lifted from the ground, the apparatus can be pushed into position below the motor vehicle without difficulty. Although the lifting means shown is hydraulic, it can also be pneumatically or possibly mechanically or electrically actuated.

Also, while the lifting means base plate 8 of the embodiment illustrated is lifted completely clear of the surface on which the apparatus stands, it would also be possible for the apparatus to be so arranged that the lifting means is only partly lifted from the surface, that is to say, sufficiently to allow the apparatus to be moved into its position of operation below a motor vehicle. Means other than the spring shown can also be used to raise the lifting means from the ground surface. Many other changes and modifications in the above described embodiment of the invention can of course be made without departing from the scope of the invention. Accordingly, that scope is intended to be limited only by the scope of the appended claims.

What is claimed is:

1. Apparatus for detecting and measuring imbalance of a motor vehicle wheel on a motor vehicle, comprising means for lifting the wheel by applying a force in the vicinity of the wheel bearing, including a first cylinder mounted for vertical movement, a piston member mounted for vertical movement within said first cylinder and having a rest on one end thereof for engaging said wheel, a second cylinder mounted about said first cylinder for downward movement and having a ground engaging portion at one end thereof and spring means disposed about said second cylinder for urging said second cylinder upwards, a force-measuring means for providing a signal indicating the magnitude and angular position of said imbalance, and means for supplying fluid pressure to the interior of said second cylinder to cause said first cylinder and piston member to move upward and said second cylinder to move downward.

2. An apparatus for measuring imbalance of a motor vehicle wheel comprising:

a frame, a first cylinder mounted on said frame for vertical movement with respect to said frame, a piston member mounted for movement within said first cylinder and having a rest on one end thereof for engaging said wheel, a stop member mounted on said piston member for engaging said first cylinder when said first cylinder has moved upward to a given position so that said piston member and first cylinder thereafter move up together, a second cylinder mounted with said first cylinder disposed for movement within said second cylinder and said second cylinder movable with respect to said frame, a base plate member mounted on said second cylinder for engaging the ground, a spring disposed about said second cylinder for urging said second cylinder upwards, means connected to the interior of said second cylinder for applying a fluid force to cause movement of said first and second cylinders, and means mounted on said frame for providing a signal indicating the magnitude and location of imbalance of a rotating wheel engaged and supported on said lifting means.

3. An apparatus as in claim 2 wherein said stop member can be placed at any of a number of positions along said piston member.

* * * * *